(12) United States Patent
Wang et al.

(10) Patent No.: US 11,111,184 B2
(45) Date of Patent: Sep. 7, 2021

(54) METHOD FOR ADDITIVE MANUFACTURING OF 3D-PRINTED ARTICLES

(71) Applicant: KAOHSIUNG MEDICAL UNIVERSITY, Kaohsiung (TW)

(72) Inventors: Chih-Kuang Wang, Kaohsiung (TW); Mei-Ling Ho, Kaohsiung (TW); Li-Cheng Pan, Kaohsiung (TW); Yin-Chih Fu, Kaohsiung (TW); Chung-Hwan Chen, Kaohsiung (TW); Je-Ken Chang, Kaohsiung (TW)

(73) Assignee: KAOHSIUNG MEDICAL UNIVERSITY, Kaohsiung (TW)

( * ) Notice: Subject to any disclaimer, the term of this patent is extended or adjusted under 35 U.S.C. 154(b) by 270 days.

(21) Appl. No.: 15/780,643

(22) PCT Filed: Dec. 2, 2016

(86) PCT No.: PCT/CN2016/108373
§ 371 (c)(1),
(2) Date: Jun. 1, 2018

(87) PCT Pub. No.: WO2017/092713
PCT Pub. Date: Jun. 8, 2017

(65) Prior Publication Data
US 2018/0354860 A1  Dec. 13, 2018

Related U.S. Application Data

(60) Provisional application No. 62/263,005, filed on Dec. 4, 2015.

(51) Int. Cl.
*C04B 35/64* (2006.01)
*B22F 1/00* (2006.01)
(Continued)

(52) U.S. Cl.
CPC ............ *C04B 35/64* (2013.01); *B22F 1/0059* (2013.01); *B22F 3/10* (2013.01); *B22F 10/10* (2021.01);
(Continued)

(58) Field of Classification Search
CPC ......... C04B 35/64; C04B 35/56; C04B 35/58; C04B 35/6269; C04B 35/111;
(Continued)

(56) References Cited

U.S. PATENT DOCUMENTS

2004/0029706 A1* 2/2004 Barrera .................. B82Y 30/00
501/99
2006/0040064 A1* 2/2006 Dombsky ............ C04B 35/5611
427/491

(Continued)

OTHER PUBLICATIONS

University of San Francisco, 'French', gauge and millimeters, downloaded Jun. 8, 2021, available at https://aam.ucsf.edu/french-gauge-and-millimeters.

(Continued)

*Primary Examiner* — Timothy Kennedy
*Assistant Examiner* — Olukorede Esan
(74) *Attorney, Agent, or Firm* — Hannah Tien

(57) ABSTRACT

The present invention provides a method of additive manufacturing a 3D-printed article, comprising: (a) printing and depositing one or more layers of a slurry by using a 3D printer, wherein the slurry comprises a ceramic powder composition; (b) further injecting an oil around the one or more layers of slurry, wherein the height of the injected oil is lower than the height of the slurry; (c) repeating steps (a) and (b) until a main body with desired geometric shape is obtained; and (d) sintering the main body by heating to obtain the 3D-printed article wherein the temperature of a printing carrier of the 3D printer is from 30 to 80° C.

14 Claims, 6 Drawing Sheets

(51) Int. Cl.
| | |
|---|---|
| *B22F 3/10* | (2006.01) |
| *C04B 35/634* | (2006.01) |
| *B33Y 10/00* | (2015.01) |
| *B29C 64/165* | (2017.01) |
| *C04B 111/00* | (2006.01) |
| *B29C 67/00* | (2017.01) |
| *C04B 35/56* | (2006.01) |
| *C04B 35/58* | (2006.01) |
| *C04B 35/626* | (2006.01) |
| *C04B 35/486* | (2006.01) |
| *C03B 19/06* | (2006.01) |
| *C04B 35/111* | (2006.01) |
| *C04B 35/18* | (2006.01) |
| *C04B 35/632* | (2006.01) |
| *B22F 10/10* | (2021.01) |
| *B33Y 70/00* | (2020.01) |
| *B28B 1/00* | (2006.01) |
| *C04B 35/447* | (2006.01) |
| *C04B 38/00* | (2006.01) |

(52) U.S. Cl.
CPC ............ *B28B 1/001* (2013.01); *B29C 64/165* (2017.08); *B29C 67/00* (2013.01); *B33Y 10/00* (2014.12); *B33Y 70/00* (2014.12); *C03B 19/06* (2013.01); *C04B 35/111* (2013.01); *C04B 35/18* (2013.01); *C04B 35/447* (2013.01); *C04B 35/486* (2013.01); *C04B 35/56* (2013.01); *C04B 35/58* (2013.01); *C04B 35/5805* (2013.01); *C04B 35/58085* (2013.01); *C04B 35/6269* (2013.01); *C04B 35/632* (2013.01); *C04B 35/63416* (2013.01); *C04B 35/63424* (2013.01); *C04B 35/63468* (2013.01); *C04B 38/0022* (2013.01); *C04B 38/0045* (2013.01); *C04B 38/00* (2013.01); *C04B 2111/00836* (2013.01); *C04B 2235/3212* (2013.01); *C04B 2235/6026* (2013.01); *C04B 2235/95* (2013.01); *C04B 2235/9615* (2013.01)

(58) Field of Classification Search
CPC ....... B33Y 10/00; B33Y 70/00; B29C 64/165; B29C 67/00; B22F 1/0059
See application file for complete search history.

(56) References Cited

U.S. PATENT DOCUMENTS

| | | | | |
|---|---|---|---|---|
| 2007/0249770 | A1* | 10/2007 | Fukui | ................ C04B 35/62655 |
| | | | | 524/394 |
| 2011/0248417 | A1* | 10/2011 | Wang | ................... C04B 28/344 |
| | | | | 264/45.3 |

OTHER PUBLICATIONS

Werner Sölken, BWG Birmingham Wire Gauge, Birmingham Wire Gauge conversion, 2008, available at www.wermac.org/pipes/birmingham_wire_gauge.html.

Wikipedia, Birmingham gauge, available at https://en.wikipedia.org/wiki/Birmingham_gauge.

* cited by examiner

Wet slip slurry          partially dry slurry          fully dry slurry

Wet slip slurry          partially dry slurry          fully dry slurry

METHOD FOR ADDITIVE MANUFACTURING OF 3D-PRINTED ARTICLES

CROSS-REFERENCES TO RELATED APPLICATIONS

This patent application is a U.S. National Stage Application of PCT/CN2016/108373 filed Dec. 2, 2016 and claims the benefit of priority from U.S. Provisional Application Ser. No. 62/263,005 filed Dec. 4, 2015, the contents of each of which are incorporated herein by reference in their entirety.

BACKGROUND OF THE INVENTION

Field of the Invention

The present invention relates to method for additive manufacturing of 3D-printed articles.

Description of Prior Art

Raw material is one of the core technologies of 3D printing. At present, plastics, metals, ceramics are the three mainstreams. However, in years to come, printing with diverse materials are inevitable.

Compared to the early use of plastics, metals became available only in relatively later stage of the development of 3D printing. In the early days when plastic was the main raw material, 3D printing was not considered as a machine-manufacturing technology. When metal printing technology was developed, the view has gradually changed ever since. Currently, there are mainly two approaches for metal 3D printing. In one approach, metal powder is leveled first (or coated with a heat-sensitive plastic adhesive), and then selectively sintered or bonded by directly using laser, in the latter case, it is sintered in a hot furnace after being bonded and molded. In the other approach, melted metal is extruded through a printing nozzle, the nozzle is moved according to a design file so that the sprayed metal is precisely molded. In the past, only plastic material was available to consumer 3D printers. However, along with the advancement of technologies in printers as well as raw materials, currently some consumer printers are capable of using raw material having special properties, for example, mixing metal powders with gels. As for pure metal 3D printers, current price is too high to be categorized as a consumer level 3D printer.

In addition to plastics and metals, ceramics and glass are also ones of raw materials for 3D printing, however there are limitations to their applications. With respect to ceramic printing, currently there are two common approaches. In one approach, ceramic powder, with an added coagulant or light-curing resin, is sprayed by a printing head. In the other approach, the printing head is used to extrude a clay strip to form a preformed blank body before being further sintered in a furnace. In either approach, ceramic printing requires two or more stages of manufacturing process, printing and enamel applying and kiln sintering, which is often associated with problems such as easy to have deformations, longer time required for drying the preformed blank body, and difficult control of expansion coefficients. At present, one of the most important applications of ceramic printing is in the medical field. It is used to manufacture human parts such as dentures, bones, etc. The application of ceramic printing here is to first scan a tooth model or bone shape through computed tomography imaging, and then print out a 3D ceramic implant to reduce production costs, accelerate healing time, thereby achieving production of customized products or reduced operating time and other issues.

Although there are some porous phosphate bioceramic implants commercially available on the market, the mechanical properties are generally poor, and precise and complex shapes of bone material are difficult to be developed, resulting in high development costs and failure of further promotion of bone healing treatment. The present invention has exploited novel negative thermo-responsive hydrogel uniform pressure shrinkage technology to develop a porous biphasic phosphate (HAp/TCP) bioceramic process, preparing bioceramics not only having micro-pores, but also better mechanical stress, and bioceramics of different ratios of biphasic phosphate (HAp/TCP) can be obtained by controlling constituents and sintering conditions. In conjunction with current 3D bioprinting technology, it is expected that porous bone materials having precise and complex shapes can be customized. Further, they are capable of carrying drugs that promote bone growth, predictably they can be prospective bone materials that have both functions of bone guiding and bone conduction.

As early as 1980s, what was known as "additive manufacturing" or "quick forming" had already been existed, which was applied to mold openings, designs and calibrations before industrial mass production. The expiration of patents on this technology in recent years, coupled with the progress of industrial development, have gradually made this technology available to be applied to daily life. The development of this technology has made unique redesigns or customized requirements possible without limitations in costs. Instead, it can be easily presented through this technology, significantly overcoming time and cost constraints, allowing the term "customization" to be an eagerly pursued developmental trend. Two-dimensional structure is transformed to be a display in three dimensions. To the best knowledge of the inventors, other than the patents and literature possessed and published by the inventors on the method for manufacturing porous ceramics with the negative thermo-sensitive hydrogel uniform pressure shrinkage system (p(NiPPAm), p(NiPAAm-MMA), etc.), there is no other similar articles. In addition, the present invention is to develop a ceramic material printing technology capable of being used in 3D printing, i.e., the use of a negative thermo-responsive hydrogel uniform pressure shrinkage system to print standardized and customized ceramic products, and the use of hydrophobic liquid oil to control the temperature and to assist in providing better shrinkage densification in the ceramic sintering process. It is applicable to traditional ceramics, biomedical ceramics, electronics and structural ceramics, etc., which all are of high market value and great potential.

DETAILED DESCRIPTION OF THE INVENTION

The 3D ceramic printing patent of the present invention mainly simplifies the manufacturing process by utilizing a negative thermo-responsive hydrogel template, and obtains an improved bi-continuous phase interpenetrating pore channel, a well-controlled shrinkage rate, in addition, a high densification which allows ceramic scaffolds to having excellent mechanical properties. These advantages set the direction for the present invention to be a patentable technology. As compared to other 3D printing material systems, ceramic material is the only material that is still in the initial stage of research and development. Although there are several similar types of technologies, this technology has the characteristics of high specificity and high sintering densification, as a result, it has high potential in the market value of traditional ceramics, glass, precision ceramics and metals. In addition, it is a better goal when being used especially as medical supplies such as implanted bioceramic implants or tooth crown material such as dental use zirconia and alumina.

For example, it can be applied to standardized and customized manufacturing processes of artificial bioceramic implants. Regardless, the porosity and size control of the porous bioceramics/must be in a range which is beneficial to bone cell growth and drug control. Although porous absorptive bioceramic production methods/porous ceramic production techniques have been widely used in the biomedical industry, the applied foaming technology or when it is achieved by using a polymer particle residue method, the types of material used may not be used in the porosity production of calcium phosphate bioceramics, the reason is whether the material has the appropriate mechanical properties and non-toxicity. Further, to achieve the bi-continuous phase interpenetrating pore channel is another problem to be resolved.

The object of the present invention is to manufacture and mold a hydrogel/ceramic material with negative thermo-sensitivity through a 3D printing technique (additive manufacturing) molding technique. The method is to utilize the inverse thermo-responsive characteristics of the negative thermo-responsive hydrogel system (p(NiPAAm), p(NiPAAm-MMA), etc.) and to mix with bioceramic powders for use, then manufacture and mold through a 3D printing equipment. The viscosity, concentration and ratio of added constituents of the negative thermo-responsive hydrogel solution is adjusted depending on the difference in ceramic powders. The temperature of the negative thermo-responsive hydrogel solution can be controlled to effectively increase uniform shrinkage among the ceramic powders, and the cost and time required by molding through mechanical force extrusion in most ceramics productions can be reduced. Because of the characteristics of the negative thermo-responsive hydrogel, the constraints caused by molds are eliminated, the varieties of molding methods and types are increased. Following the development of 3D printing technology and taking advantage of the inverse thermo-sensitivity of the negative thermo-responsive hydrogel, the temperature of printing and molding is controlled, the types are unlimited, and interpenetrating pores with regularities are provided, thereby overcoming the limitations of traditional bioceramic production.

Therefore, the present invention provides a system containing a hydrogel, which is negative thermo-responsive and shrinkable under uniform pressure, mixed with ceramic powders, the system is capable of performing 3D printing of ceramic structures, which comprises utilization of the negative thermo-responsive hydrogel, wherein the negative thermo-responsive hydrogel may be, for example, poly(N-isopropylacrylamide) (p(NiPAAM), poly(N-isopropylacrylamide-co-methacrylic acid (p(NiPAAm-MAA)) and similar negative thermo-responsive compounds; the bioceramic material may be hydroxyl apatite (HA), tricalcium phosphate (TCP), high density alumina (Al2O3), zirconia (ZrO2), bioglass (BG), and similar bioceramic materials; the 3D printing bioceramic printing technology may be fused deposition modeling (FDM), digital light processing (LDP), stereolithography (SLA) and related 3d printing technologies.

The present invention has the following advantages:

(1) The negative thermo-responsive hydrogel is capable of being shrunk under uniform pressure when the temperature rises, allowing the sintered powder body to be densified. The principle is similar to the cold isostatic pressing (CIP) molding technology, which can uniformly shrink, reducing the internal stress during shrinkage. As a result, a slow and time-consuming drying process is not required, the sintering process can be carried out immediately, and a sintered body that does not crack and has better mechanical properties can be easily obtained.

(2) The viscosity of the negative thermo-responsive hydrogel allows the pores into a sludge-like blank body by uniformly stirring, leaving pores after being sintered. It can also degas by stirring under vacuum to facilitate 3D printing, becoming a 3D printing ink material, performing basic printed products having complex shapes and interpenetrating pores.

(3) Parameters controlled during the 3D printing process: a. various temperatures, pressures, speeds, printing pore diameters, etc. of the machine; b. powder size, solid-liquid ratio, viscosity, hydrogel concentration of the ceramic printing ink material; c. the printing cell substrate needs to be dipped in a liquid oil phase, by gradually controlling the height of the oil, the temperature of the printing material can be controlled on the one hand, and on the other hand, the water phase mud-like mixed printing material can be coated with oil, which is beneficial to the subsequent high temperature shrinking and sintering process, achieving a result of high densification of ceramic sintering.

When the negative thermo-responsive hydrogel is used for 3D printing, a photo-curing initiator can be added so that it can be cured and molded through UV light irradiation. This curing method can improve the precision of printing and production of more complex shapes.

A method for additive manufacturing a 3D-printed article, comprising: (a) printing and depositing one or more layers of a slurry by using a 3D printer, wherein the slurry comprises a ceramic powder composition; (b) further injecting an oil around the one or more layers of slurry, wherein the height of the injected oil is lower than the height of the slurry; (c) repeating steps (a) and (b) until a main body with desired geometric shape is obtained; and (d) sintering the main body by heating to obtain the 3D-printed article wherein the temperature of a printing carrier of the 3D printer is from 30 to 80° C.

In a preferred embodiment, the slurry is a composition the slurry is a composition which comprises ceramic powder, glass powder, or metal powder. In another preferred embodiment, the oil includes, but is not limited to, synthetic oil (for example, polyglycol, silicone oil, fluorinated oil, phosphoric ester, polyether, etc.), mineral oil (for example, paraffin, dodecyl alcohol, etc.) vegetable oil (for example, olive oil, soybean oil), hydrocarbon mineral oil, liquid paraffin, or synthetic hydrocarbon. In another preferred embodiment, the ceramic powder includes, but is not limited to, hydroxylapatite (HA), tricalcium phosphate (TCP), high density alumina ($Al_2O_3$), zirconia ($ZrO_2$), bioglass (BG), carbide ceramic materials (for example, silicon carbide, etc.), nitride ceramic materials (for example, silicon nitride), aluminum silicate, boride ceramic materials or silicide ceramic materials.

In a preferred embodiment, the viscosity of the slurry ranges from 100 to 900 cP, the size of a nozzle of the 3D printer ranges from 19 to 30G, and the printing speed of the 3D printer ranges from 0.1 to 5 cm/s.

In a preferred embodiment, the heating includes the following four stages:

First Stage: heating slowly to the degree of 600° C. to 650° C. within 2 hours (3 to 6° C./min), and maintaining the temperature for 30 to 60 minutes;

Second Stage: raising the temperature rapidly to the degree of 1150° C. to 1250° C. in 20 to 30 minutes (15 to 25° C./min), and maintaining the temperature for 10 to 30 minutes;

Third Stage: heating slowly to the degree of 1250° C. to 1350° C. in 10 to 30 minutes (3 to 6° C./min), and maintaining the temperature for 1 to 3 hours; and Fourth Stage: reducing the temperature to 25° C. slowly by cooling.

In a preferred embodiment, the slurry is prepared by following steps: (a) synthesizing poly(N-isopropylacrylamide) (p(NiPAAm)) or poly(N-isopropylacrylamide-co-methacrylic acid) (p(NiPAAm-MAA)); (b) mixing a dispersant with hydroxylapatite; (c) mixing the p(NiPAAm) or the p(NiPAAm-MAA) of step (a) with water to obtain a hydrogel solution; (d) mixing the hydrogel solution of step (c) with product of step (b) to produce a mixture; and (e) stirring the mixture of step (d) to produce the slurry. In a more preferred embodiment, which further comprise adding polymer particles to the mixture of the step (d) before step (e). In another better embodiment, the polymer particle includes, but is not limited to, polyethylene.

In another preferred embodiment, the hydroxylapatite and the dispersant of step (b) are mixed in a weight ratio ranging from 25:1 to 25:5. the dispersant of the step (b) may be polyacrylic acid (PAA), polymethacrylic acid (PMA), or poly-vinyl-alcohol (PVA) and the likes; the hydroxylapatite or calcium phosphate salts of the step (b) is sintered to the degree of 700° C. to 900° C. in a high-temperature furnace before being mixed; the p(NiPAAm-MAA) and the water of step (c) are mixed in a volume ratio ranging from 1:10 to 2:1; the volume of the macromolecular particles of the step (e) is equivalent to 5% to 50% of the total volume of the mixture of step (d).

In another preferred embodiment, the method further comprises adding a photocuring initiator to the hydrogel solution of step (c) to allow the slurry to be photocured and molded after being irradiated by UV light, that is, the negative thermo-responsive hydrogel is cured and molded by UV light. The type of the photocuring initiator includes, but is not limited to, a radical type photocuring initiator or a cationic photocuring initiator. The radical type photocuring initiator includes, but is not limited to, acrylic acid or unsaturated polyester, the cationic photocuring initiator includes, but is not limited to, an epoxy compound, oxetane or vinyl ether.

In one preferred embodiment, the porous ceramic composition is provided with nanopores or micropores and can be used as a biomaterial scaffold; the biomaterial scaffold is partially bioabsorbable. In one preferred embodiment, the biomaterial scaffold is used as an artificial bone, and mixed with substances stimulating bone generation, wherein the substances stimulating bone generation is selected from the group consisting of bone marrow, BMP growth factor, angiogenesis factor, statin drugs, bisphosphonate drugs, bone cells, stem cells and pharmaceutical carriers thereof. In another preferred embodiment, the biomaterial scaffold is used as a carrier for therapeutic agents. In one better embodiment, the therapeutic agent is an antibiotic drug.

The present invention provides a system having a negative thermo-responsive hydrogel mixed with ceramic powders, the system is capable of performing 3D printing of ceramic structures, which comprises utilization of the negative thermo-responsive hydrogel, wherein the negative thermo-responsive hydrogel may be, for example, poly(N-isopropylacrylamide) (p(NiPAAM), poly(N-isopropylacrylamide-co-methacrylic acid) (p(NiPAAm-MAA)) and similar negative thermo-responsive compounds; the bioceramic material may be hydroxyl apatite (HA), tricalcium phosphate (TCP), high density alumina ($Al_2O_3$), zirconia ($ZrO_2$), bioglass (BG), and similar bioceramic materials; the 3D printing bioceramic printing technology may be fused deposition modeling (FDM), digital light processing (LDP), stereolithography (SLA) and related 3D printing technologies.

EXAMPLES

Figure 1:
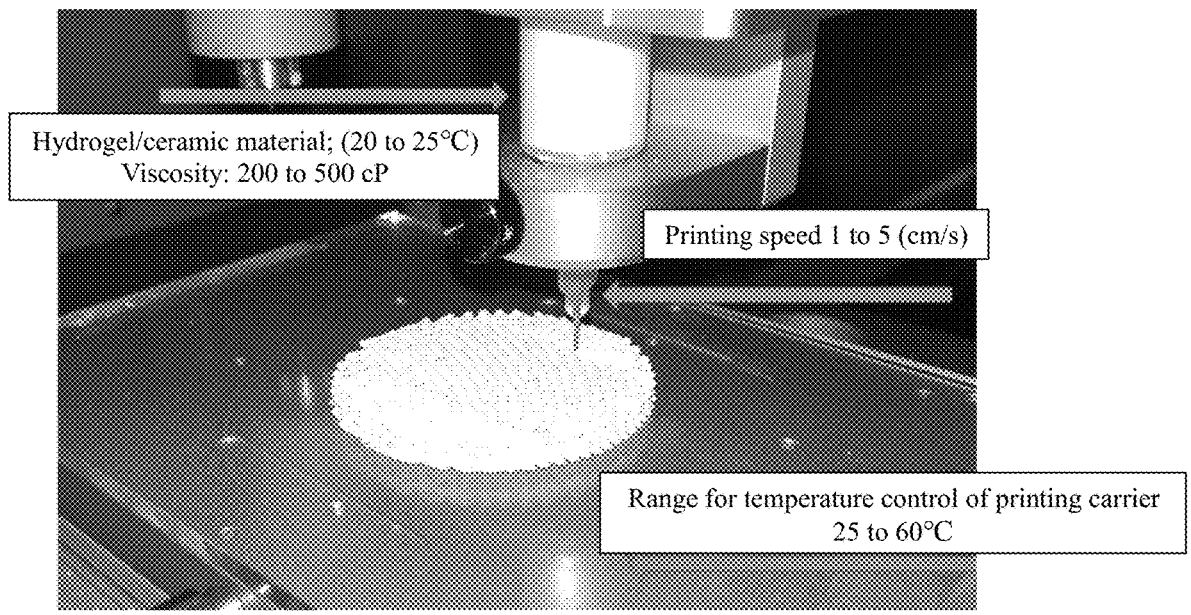
FIG. 1 shows condition parameters for 3D printing of the bio-hydrogel ceramic material.
Figure 2:
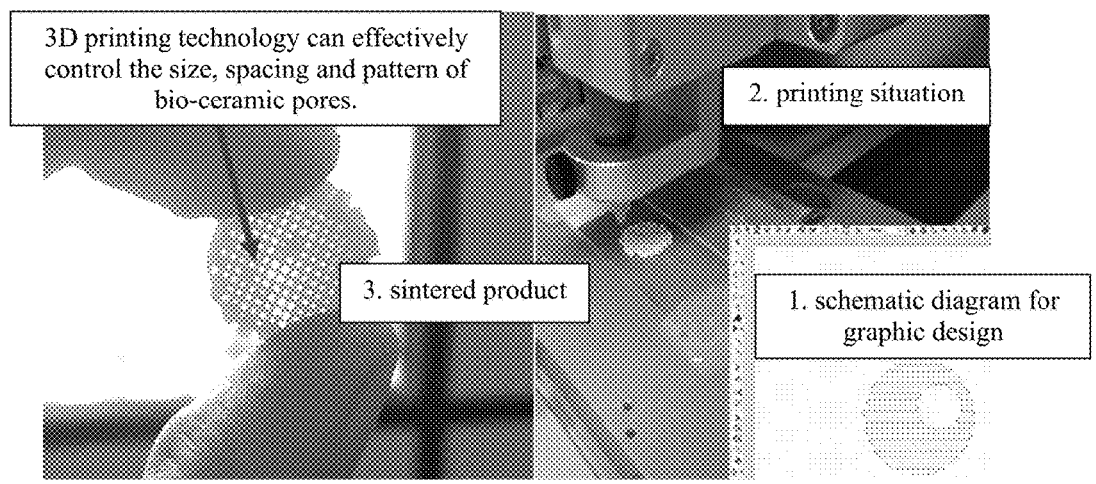
FIG. 2 shows that the 3D printing technology can effectively control the size, spacing and pattern of bio-ceramic pores.
Figure 3:
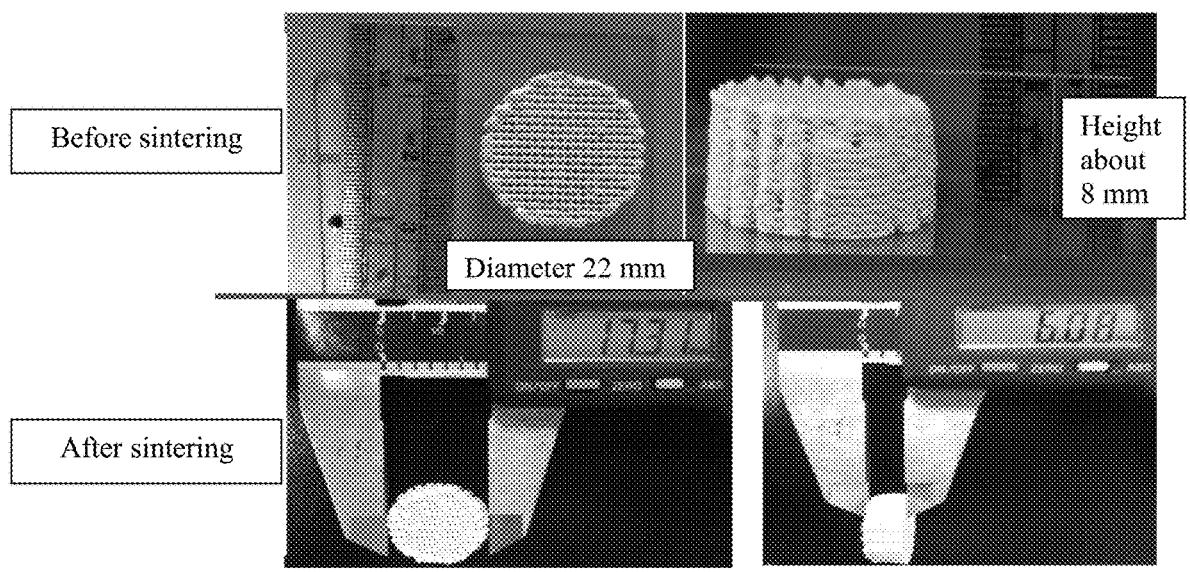
FIG. 3 shows an embodiment of uniform shrinkage and enhanced sintered density.

The examples below are non-limiting and are merely representative of various aspects and features of the present invention.

The present invention relates to preparing bioceramics by a 3D printing technology molding (additive manufacturing), i.e., bioceramics. For the method for preparing a composition comprising porous ceramic with thermo-responsive hydrogel, please refer to U.S. Pat. No. 8,940,203. The present invention utilizes the combination of a thermo-responsive hydrogel and the 3D printing technology to prepare a porous ceramic. Therefore, the goals of the present invention are: (1) adjustment of the ratio range of the negative thermo-responsive hydrogel/ceramic powder for the optimal condition of 3D printing and molding; (2) the range of the optimal control conditions during a 3D printing manufacturing process; (3) 3D printing and manufacturing of bioceramics (HAp/β-TCP)/negative thermo-responsive hydrogel (p(NiPAAm-MMA)), and detection and analysis; (4) 3D printing and manufacturing of oil-containing (such as silicone oil) bioceramics (HAp/β-TCP)/thermo-responsive hydrogel (p(NiPAAm-MMA)), and detection and analysis; (5) 3D printing and manufacturing of bioceramics (zirconia, $ZrO_2$)/negative thermo-responsive hydrogel (p(NiPAAm-MMA)), and detection and analysis; (6) 3D printing and manufacturing of oil-containing (such as silicone oil) bioceramics (zirconia, $ZrO_2$)/negative thermo-responsive hydrogel (p(NiPAAm-MMA)), and detection and analysis; (7) addition of a UV photo-curing initiator to the negative thermo-responsive hydrogel ceramics for proceeding a photo-curing printing. The mixing ratio of the negative thermo-responsive hydrogel solution and the ceramic powder was the weight percentage (wt %) of the negative thermo-responsive hydrogel solution and the weight of the ceramic powder. The condition of the 3D printing of negative thermo-responsive hydrogel/bioceramics was designed with the thermo-responsive properties of the negative thermo-responsive hydrogel, the temperature control on the printing carrier was adjusted so as to undergo phase transformation and shrinkage of the negative thermo-responsive hydrogel, allowing tightness among ceramic powders and achieving the molding effect. Other printing control conditions included the pressure of material extruding discharger of printing head, the printing speed, and the size of needle on a printing material discharge end. After 3D printing and manufacturing of the bioceramics, the high temperature sinter activities performed with or without added oil (silicon oil as the example) to cover the bioceramics were used as comparing groups, the ratio of shrinkage in the presence or absence of oil coverage before and after sintering were examined and compared Two different ceramic powders were used to verify the combinations of the negative thermo-responsive hydrogel system and the 3D printing technology for different ceramic powders. The preliminary results showed that after the negative thermo-responsive hydrogel and the bioceramics were mixed and agitated, the viscosity of the hydrogel needed to reach about 100 to 900 cP, which was in line with the material discharge range of 50 to 200,000 mPa·s driven by the gas of a 3D printing machine. According to the particle size of the bioceramic powder and the thickness of printed lines, it was suitable to select a printing needle size ranging from 19G to 30G for proceeding the manufacturing. The movement speed of a printing head for 3D printing and manufacturing was one of the determining factors of the line thickness. After being physically tested, the best printing speed was in the range of 0.1 to 5 (cm/s). The shrinkage rate of oil containing—(silicon oil, hydrocarbon mineral oil, liquid paraffin, paraffin, synthetic hydrocarbons, etc.) or oil free-bioceramics (HAp/β-TCP)/negative thermo-responsive hydrogel (p(NiPAAm-MMA) or p(NiPAAm)) manufactured by 3D printing before and after sintering were compared, wherein the oil-covering group had a higher shrinkage rate, a shrinkage rate up to 27.9%. When different bioceramic powders were compared, the shrinkage rate of the oil containing- or oil free-bioceramics (zirconia, $ZrO_2$)/negative thermo-responsive hydrogel (p(NiPAAm-MMA)) manufactured by 3D printing before and after sintering were compared, similarly, the oil-covering group had a higher shrinkage rate, a shrinkage rate up to 36%. At present, when the sintered ceramics were observed with a scanning electron microscope (SEM), the size of the pores was approximately 500 μm from a front view, and then the surface morphology was observed from a side view, a stacked pattern having interlaced bars specific to 3D printing and molding could be observed. The present invention successfully manufactured a system suitable for 3D printing of bioceramic. This negative thermo-responsive hydrogel of the system was able to use in combination with a variety of bioceramic materials, and multivariate patterns were printed by temperature-control of a 3D printing equipment, in which the use of negative thermo-responsive hydrogel in combination with an oil phase solution further enhanced the shrinkage effect of the bioceramics.

1. The ratio for mixing and agitating the negative thermo-responsive hydrogel solution and the ceramic powder was measure by the weight percentage concentration (wt %) of the negative thermo-responsive hydrogel solution and the weight of the ceramic powder, the best example would be adjusted according to the characteristic difference of the ceramic powder. The following was the actually implemented ratio:

(1) Tricalcium Phosphate (β-TCP) ceramic powder: In 1 mL of 15% negative thermo-responsive hydrogel solution, 2.0 g of calcium phosphate ceramic powder was added and agitated for 8 minutes under vacuum to obtain a printable slurry.

(2) Zirconia ($ZrO_2$) ceramic powder: In 1 mL of 10% negative thermo-responsive hydrogel solution, 1.8 g of zirconia ceramic powder was added and agitated for 8 minutes under vacuum to obtain a printable slurry.

(3) Hydroxylapatite (HAp) ceramic powder: In 1 mL of 15% negative thermo-responsive hydrogel solution, 2.0 g of hydroxylapatite ceramic powder was added and agitated for 8 minutes under vacuum to obtain a printable slurry.

2. The condition of the 3D printing negative thermo-responsive hydrogel/bioceramics was designed with the thermo-responsive properties of the negative thermo-responsive hydrogel, the temperature control on the printing carrier was adjusted so as to proceed phase transformation and shrinkage of the negative thermo-responsive hydrogel, allowing tightness among ceramic powders and achieving the molding effect. Other printing control conditions included the pressure of material extruding discharger of printing head, the printing speed, and the size of needle on a printing material discharge end.

(1) The movement speed of a printing head for 3D printing and manufacturing was one of the determining factors of the line thickness. After being physically tested, the best printing speed was in the range of 0.1 to 5 (cm/s).

(2) The material discharge speed of a printing head for 3D printing and manufacturing was one of the determining factors of the line thickness. After being physically tested, the best material discharge speed was 23G of needle primarily (internal diameter 25 mm), and the air pressure required to pneumatically push the material to be discharged was ±4.5 bar.

(3) The curing and molding conditions for 3D printing and manufacturing of the negative thermo-responsive hydrogel was to increase the temperature of the printing carrier so that the negative thermo-responsive hydrogel underwent phase transformation and shrinkage, the temperature was ±40° C. In another preferred embodiment, the temperature of the printing carrier was heated to 30 to 80° C.

Figure 4:
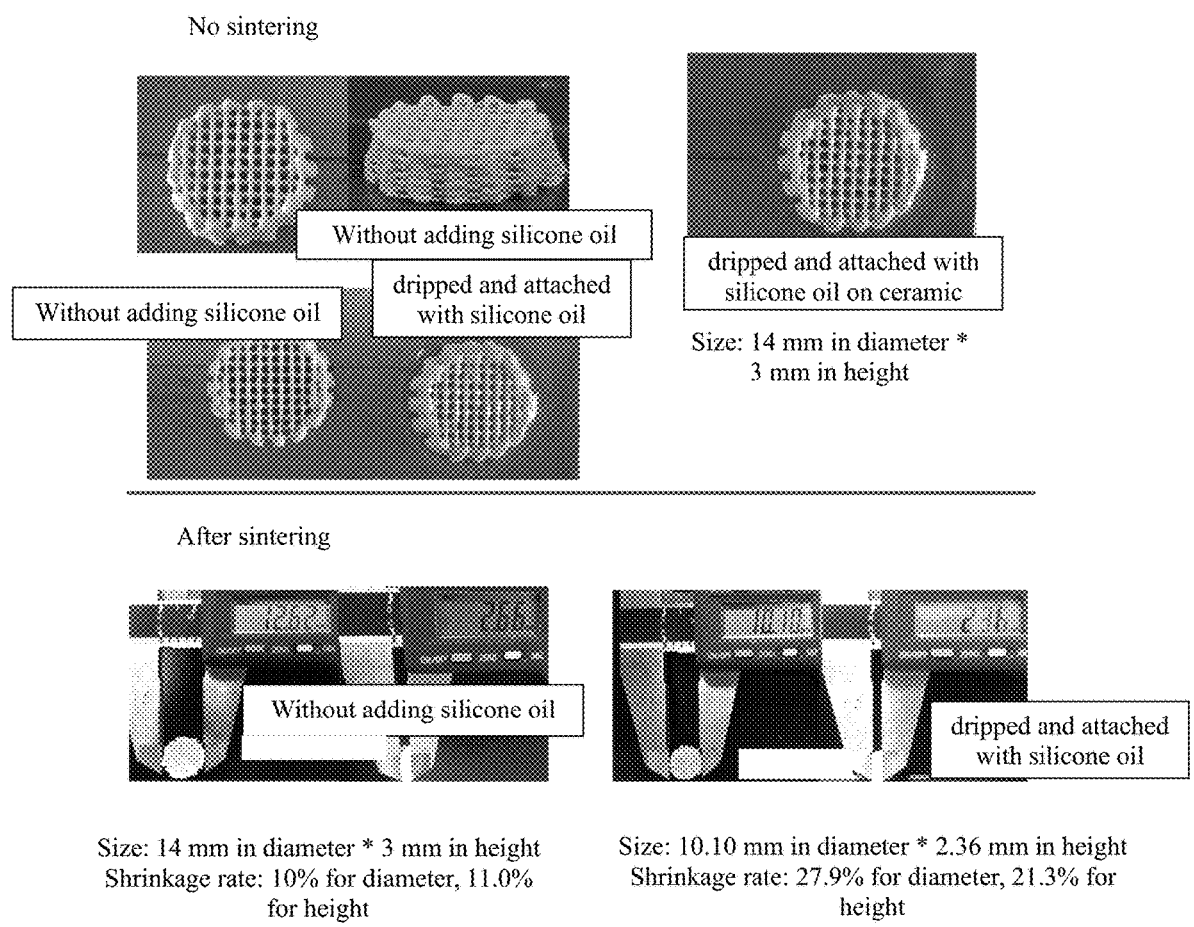
FIG. 4 shows a comparison of the shrinkage rate of phosphate ceramics with or without oil.

3. With respect to the 3D printing and manufacturing of negative thermo-responsive hydrogel/bioceramic, after completion of the printing and before the sintering was performed, the printed ceramics was covered by oil and sent to a high temperature furnace for sintering. The following were the differences in shrinkage with and without oil covering, and the ceramic sintering temperatures:

(1) The agitated and mixed hydroxylapatite slurry was subjected to printing and molding, the object to be printed was about 14 mm in diameter and 3 mm in height, one of which was covered with silicone oil, sent to a high temperature furnace to be sintered at a gradient temperature of ±1250° C. for 6 to 8 hours. Upon completion, the diameter and height were measured to obtain the shrinkage rate (see FIG. 4). The shrinkage rate of the ceramic block without the addition of silicone oil and after being sintered was: 10% for diameter, 11.0% for height; the shrinkage rate of the ceramic block dripped and attached with silicone oil and after being sintered was: 27.9% for diameter, 21.3% for height.

Figure 5:
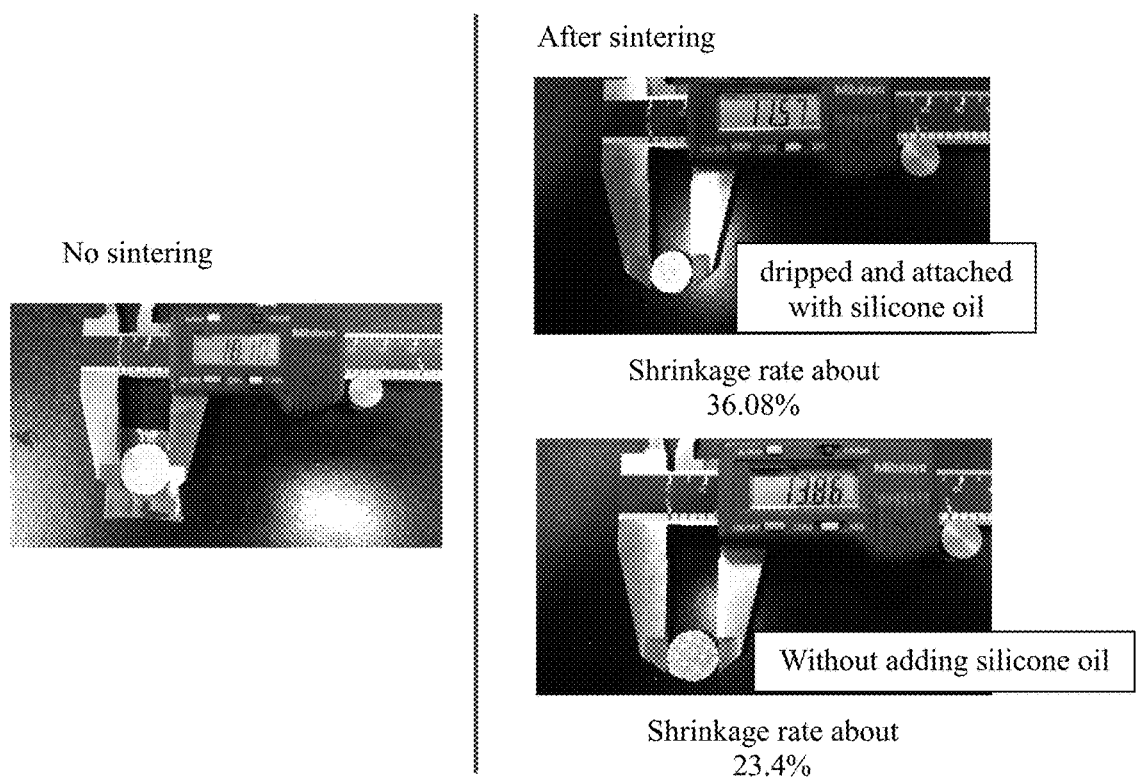
FIG. 5 shows a comparison of the shrinkage rate of zirconia ceramics with or without oil.
Figure 6:
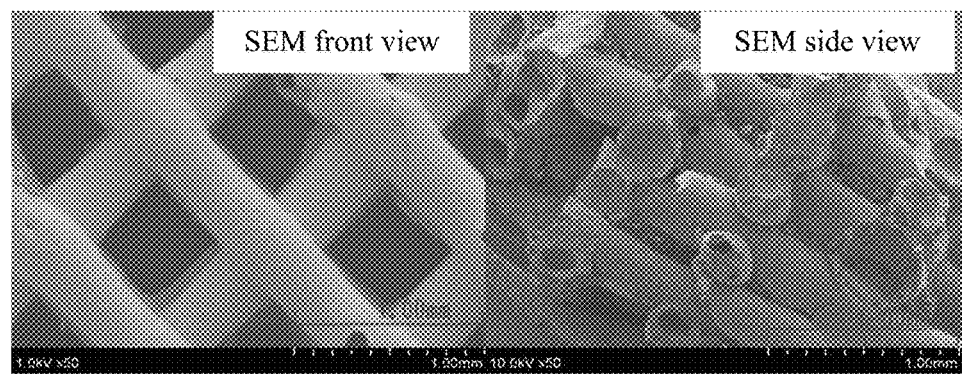
FIG. 6 shows a 3D printing of calcium phosphate bioceramic composite scaffold having interpenetrating pores.

(2) The agitated and mixed zirconia slurry was subjected to printing and molding, the object to be printed was about 18.10 mm in diameter, one of which was covered with silicon oil, sent to a high temperature furnace to be sintered at a gradient temperature of ±1400° C. for 6 to 8 hours. Upon completion, the diameter and height were measured to obtain the shrinkage rate (FIG. 5). The shrinkage rate of the ceramic block without silicone oil and after being sintered was: 23.4% for diameter; the shrinkage rate of the ceramic block dripped and attached with silicon oil and after being sintered was: 36.08% for diameter.

4. 3D printing and molding technology of negative thermo-responsive hydrogel/bioceramic:

With respect to previous curing technologies, the printing and manufacturing was performed by using temperature control. However, since the negative thermo-responsive hydrogel has a functional group structure for photo-curing mechanism, the printing and manufacturing could be converted into a printing performed in a photo-curing and molding manner by adding a photo-curing initiator.

A photo-curing printing example, in which 1 to 5% of photo-curing initiator 12959 (UV absorption wavelength was 365 mm) was added to 15% of negative thermo-responsive hydrogel and agitated for 1 to 2 days, and then agitated with hydroxylapatite (HAp) ceramic powder, 2.0 g of hydroxylapatite ceramic powder was added to 1 mL of 15% negative thermo-responsive hydrogel solution, agitated and mixed under vacuum for 8 minutes to obtain a printable slurry.

Figure 7:
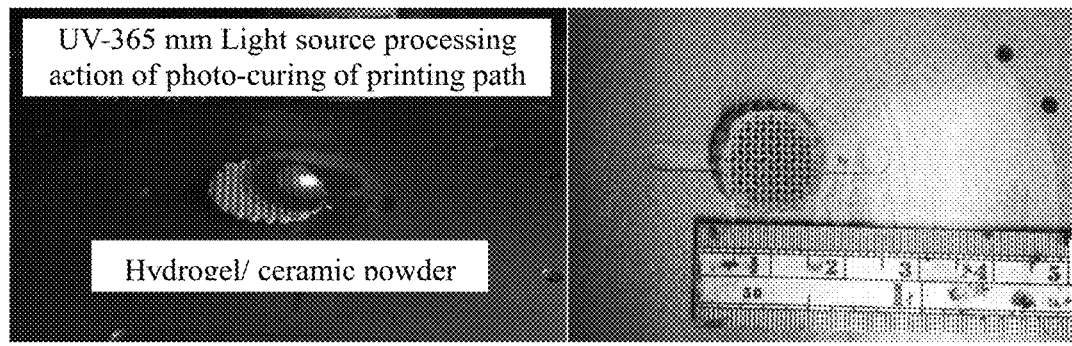
FIG. 7 is a UV photo-cured and molded 3D printing of calcium phosphate bioceramic composite scaffold.
Figure 8:
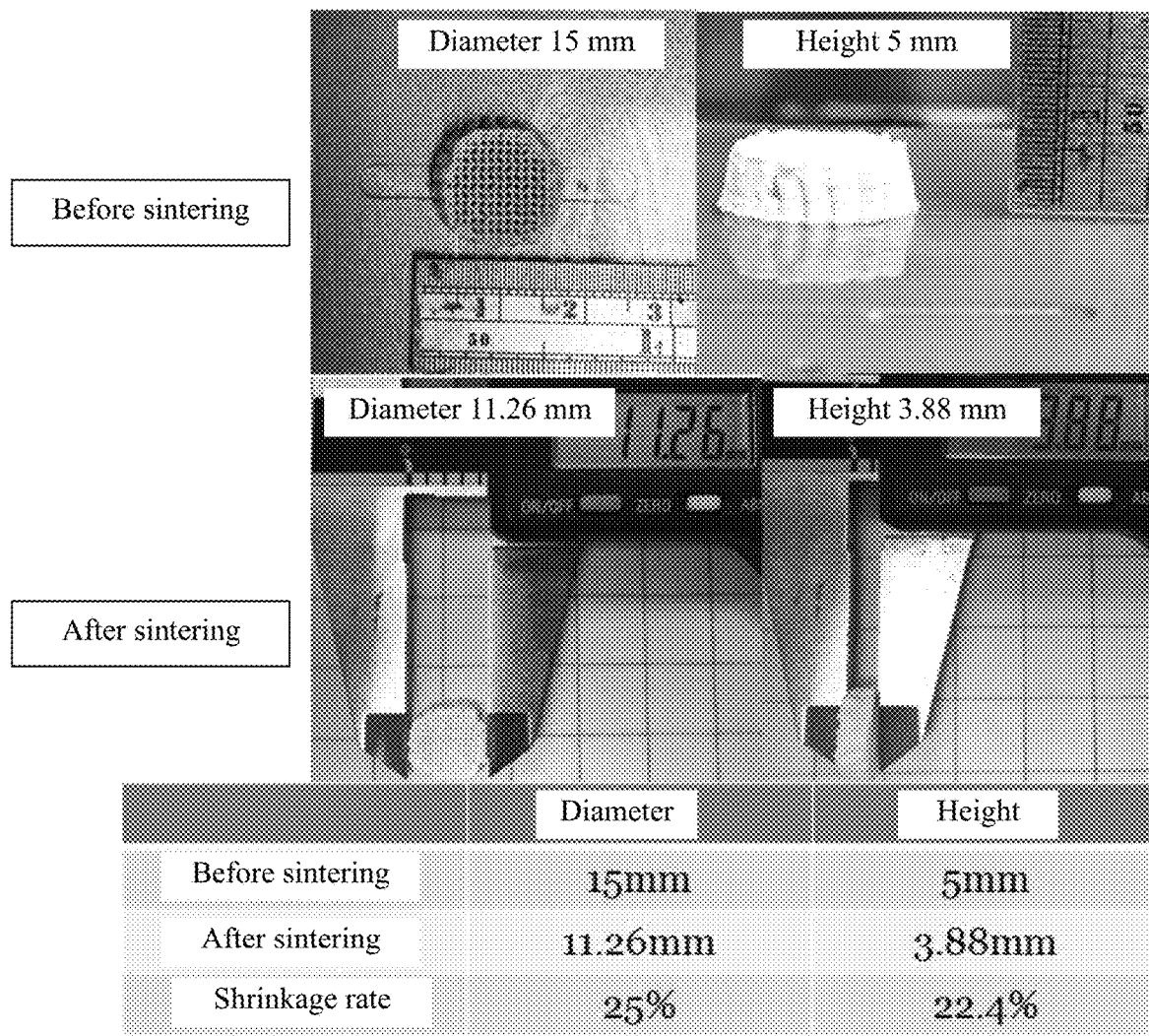
FIG. 8 shows a comparison of the shrinkage rate of an UV-cured and molded ceramic phosphate ceramics containing oil.
Figure 9:
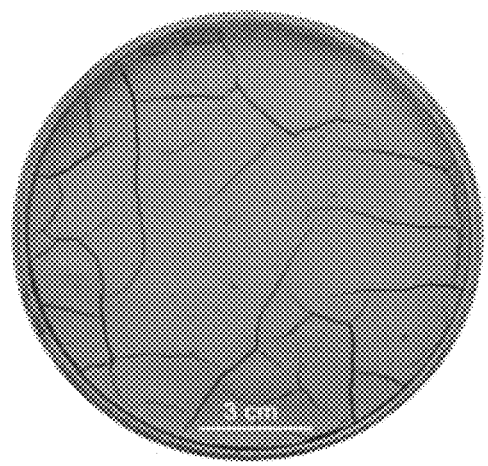
FIG. 9 is a schematic drawing of a ceramic crack after uneven shrinkage. (Drying too quickly causes the specimen to bend or crack due to uneven shrinkage).
Figure 10:
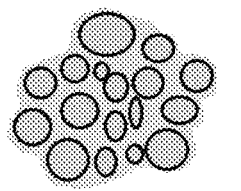
FIG. 10 is a schematic diagram of the shrinkage of a dry powder dried without oil film. During the heating process, the hydrogel on the outer periphery of the preformed blank shrinks first, but while the temperature is increasing, the surrounding moisture also dissipates, which makes it difficult for the outer particles to have a high degree of shrinkage and densification. The pores tend to generate easily in the internal powder during the subsequent temperature increasing process.
Figure 10:
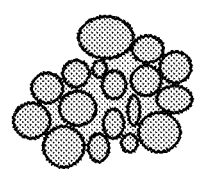
Figure 10:
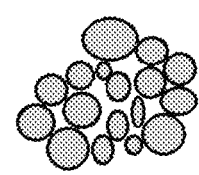
Figure 11:
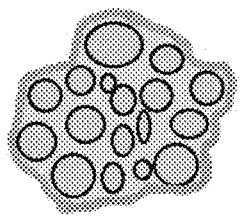
FIG. 11 is a schematic diagram of the shrinkage of a dry powder dried with oil film. During the heating process, the outer periphery of the preformed blank is coated with an oil film, which facilitates the shrinkage of the entire hydrogel and the dissipation of water to the outer periphery. Therefore, it is easier to have a high shrinkage rate, improving the densification of sintering. During the subsequent temperature increasing process, the porosity of the internal powder reduces significantly due to high temperature sintering and diffusion.
Figure 11:
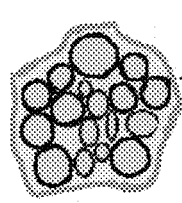
Figure 11:
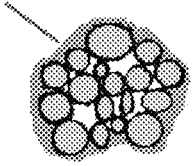

While printing, the photo-curing path and related irradiation time were provided by setting an UV module in order to cure and mold (see FIG. 7). A ceramic of 15 mm in diameter and 5 mm in height was printed, dripped and attached with silicon oil to cover, sent to a high temperature furnace to sintered at a gradient temperature of ±1250° C. for 6 to 8 hours. Upon completion, the diameter and height were measured, the size of ceramic block after sintered was 11.26 mm in diameter and 3.88 mm in height, and the shrinkage rate was 25% for diameter and 22.4% for height, respectively. (FIG. 8)

Results:

The above experimental results confirm that:

(1) The 3D printing molding technology performed by using the negative thermo-responsive hydrogel mixed and agitated with ceramic powder of the present invention is a feasible 3D molding technology.

(2) With respect to the 3D printing and molding process, printing parameters could be adjusted, the discharge rate of slurry, the movement rate of the printing head, the temperature of the carrier, the inner diameter of the printing needle, and other related parameters are controlled in order to proceed the manufacturing.

(3) The negative thermo-responsive hydrogel system may be mixed and agitated with most ceramic powders for manufacturing and sintering, curing and molding for printing with the characteristics of phase transformation and shrinkage of the negative thermo-responsive hydrogel, and during the sintering process, the temperature is raised to further increase the shrinkage force, similar to the pressure equalization method in the traditional ceramic art, the shrinkage rate can be up to 10 to 20% as shown in the above experimental results.

(4) In the experiment of the present invention, an action of covering a printed ceramic object by dripping and attaching an oil is proposed. This step can effectively improve the shrinkage effect of the ceramic sintering, and as shown in the above experimental results, the shrinkage rate can be up to 20 to 40%, having a greater shrinkage rate than the one with no oil dripped and attached.

(5) The negative thermo-responsive hydrogel material used in the present invention can be added with a photo-curing initiator to convert it into a photocurable gel material. When being used in printing, the curing effect could be achieved by irradiation of the UV light, and the shrink capability remains the same.

What is claimed is:

1. A method for additive manufacturing a 3D-printed article, comprising:
   (a) printing and depositing one or more layers of a slurry by using a 3D printer to obtain a printed ceramic object, wherein the slurry comprises a ceramic powder composition;
   (b) covering outer periphery of the printed ceramic object with an oil; and
   (c) sintering the oil-covered printed ceramic object from step (b) by heating to obtain the 3D-printed article wherein the temperature of a printing carrier of the 3D printer is from 30 to 80° C.

2. The method of claim 1, wherein the ceramic powder comprises hydroxylapatite, tricalcium phosphate, high density alumina, zirconia, bioglass, carbide ceramic materials, nitride ceramic materials, aluminum silicate, boride ceramic materials or silicide ceramic materials.

3. The method of claim 1, wherein the oil comprises polyglycol, silicone oil, fluorinated oil, phosphoric ester, polyether, paraffin, dodecyl alcohol, olive oil, soybean oil, hydrocarbon mineral oil, liquid paraffin, or synthetic hydrocarbon.

4. The method of claim 1, wherein the viscosity of the slurry ranges from 100 to 900 cP.

5. The method of claim 1, wherein the size of a nozzle of the 3D printer ranges from 19 to 30G.

6. The method of claim 1, wherein the printing speed of the 3D printer ranges from 0.1 to 5 cm/s.

7. The method of claim 1, wherein the slurry in step (a) comprises a ceramic powder composition and a hydrogel, and the slurry is prepared by following steps:
   (1) synthesizing poly(N-isopropylacrylamide) (p(NiPAAm)) or poly(N-isopropylacrylamide-co-methacrylic acid) (p(NiPAAm-MAA));
   (2) mixing a dispersant with hydroxylapatite;
   (3) mixing the p(NiPAAm) or the p(NiPAAm-MAA) of step (a) with water to obtain a hydrogel solution;

(4) mixing the hydrogel solution of step (c) with product of step (b) to produce a mixture; and (5) stirring the mixture of step (4) to produce the slurry.

8. The method of claim 7, which further comprise adding polymer particles to the mixture of step (4) prior to step (5).

9. The method of claim 7, wherein the hydroxylapatite and the dispersant of step (2) are mixed in a weight ratio ranging from 25:1 to 25:5.

10. The method of claim 7, wherein the dispersant of step (2) is polyacrylic acid (PAA), polymethacrylic acid (PMA), or polyvinyl alcohol (PVA).

11. The method of claim 7, wherein the p(NiPAAm-MAA) and the water of step (3) are mixed in a volume ratio ranging from 1:10 to 2:1.

12. The method of claim 7, which further comprises adding a photocuring initiator to the hydrogel solution of step (3) to allow the slurry to be photocured and molded after being irradiated by UV light.

13. The method of claim 12, wherein the photocuring initiator is a radical type photocuring initiator or a cationic type photocuring initiator.

14. The method of claim 13, wherein the radical type photocuring initiator comprises acrylic acid or unsaturated polyester, the cationic photocuring initiator comprises an epoxy compound, oxetane or vinyl ether.

* * * * *